United States Patent
Schmid et al.

(10) Patent No.: US 8,019,527 B2
(45) Date of Patent: Sep. 13, 2011

(54) METHOD FOR OPERATING AN INTERNAL COMBUSTION ENGINE, AND ASSOCIATED INTERNAL COMBUSTION ENGINE

(75) Inventors: Wolfram Schmid, Nürtingen (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 1030 days.

(21) Appl. No.: 11/901,447

(22) Filed: Sep. 17, 2007

(65) Prior Publication Data
US 2008/0035111 A1 Feb. 14, 2008

Related U.S. Application Data

(63) Continuation-in-part of application No. PCT/EP2006/001820, filed on Feb. 28, 2006.

(30) Foreign Application Priority Data

Mar. 17, 2005 (DE) .................. 10 2005 012 306

(51) Int. Cl.
*B60T 7/12* (2006.01)
(52) U.S. Cl. .................. 701/105; 123/435; 123/345
(58) Field of Classification Search .............. 123/90.17, 123/294, 435, 568.14, 434, 673, 321, 322, 123/345–348, 90.15; 701/103, 104, 105
See application file for complete search history.

(56) References Cited

U.S. PATENT DOCUMENTS

| | | | |
|---|---|---|---|
| 5,558,051 A | 9/1996 | Yoshioka | |
| 6,055,948 A * | 5/2000 | Shiraishi et al. | 123/90.15 |
| 6,530,361 B1 | 3/2003 | Shiraishi et al. | |
| 6,550,444 B2 * | 4/2003 | Shiraishi et al. | 123/294 |
| 6,564,763 B2 * | 5/2003 | Shiraishi et al. | 123/90.15 |
| 6,615,771 B2 * | 9/2003 | Denger et al. | 123/21 |
| 6,688,280 B2 | 2/2004 | Weber et al. | |
| 2003/0131805 A1 * | 7/2003 | Yang | 123/27 R |
| 2004/0118118 A1 * | 6/2004 | Weber et al. | 60/612 |
| 2004/0139949 A1 | 7/2004 | Koseki et al. | |
| 2004/0221831 A1 * | 11/2004 | Chmela et al. | 123/301 |
| 2005/0235939 A1 * | 10/2005 | Wilke | 123/90.17 |

FOREIGN PATENT DOCUMENTS

| | | |
|---|---|---|
| DE | 197 34 494 | 10/1998 |
| DE | 199 08 454 | 9/1999 |
| DE | 100 32 232 | 2/2001 |
| FR | 2 840 015 | 11/2003 |

* cited by examiner

*Primary Examiner* — John T Kwon
(74) *Attorney, Agent, or Firm* — Klaus J. Bach

(57) ABSTRACT

In a method for operating an internal combustion engine including inlet valves with variably adjustable opening curves, during part-load operation, the closing time of the inlet valves and the fuel injection time are controlled as a function of the cylinder internal temperature so as to maintain the cylinder internal temperature relatively low in a controllable manner for reducing $NO_x$ emissions.

18 Claims, 3 Drawing Sheets

METHOD FOR OPERATING AN INTERNAL COMBUSTION ENGINE, AND ASSOCIATED INTERNAL COMBUSTION ENGINE

This is a Continuation-In-Part Application of pending International Patent Application PCT/EP2006/001820 filed Feb. 28, 2006 and claiming the priority of German Patent Application 10 2005 012 306.6 filed Mar. 17, 2005.

BACKGROUND OF THE INVENTION

The invention relates to a method for operating an internal combustion engine having intake and exhaust valves the opening of the intake valve being adjustable depending on the engine operating conditions.

U.S. Pat. No. 6,688,280 B2 discloses a method for the reduction of nitrogen oxides which are generated during fired operation of an internal combustion engine. Here, full closing of the inlet valves of the cylinders is delayed such that, at the beginning of the compression stroke, the inlet valve remains in the open position and a part of the combustion air which has already been introduced into the combustion chamber can flow back again via the open inlet valve into the upstream air collector. In this way, both the combustion chamber internal pressure and also the combustion chamber temperature are lowered, which reduces the generation of nitrogen oxides.

The nitrogen oxide emissions can also be reduced by means of exhaust gas recirculation. Such a method is described for example in DE 197 34 494 C1, wherein during part-load operation of the internal combustion engine, a part of the exhaust gas mass flow is conducted out of the exhaust system and returned, via a recirculation line into the intake tract, where the exhaust gas is mixed with the combustion air which is taken in. With such an exhaust gas recirculation, however, there is the problem that, with an increasing recirculation rate, the risk of contamination or coking in particular of an exhaust gas cooler which is situated in the recirculation line is increased, whereby the thermal efficiency of the internal combustion engine, the power capacity of the engine and the exhaust gas properties are adversely affected.

It is the object of the present invention to lower the exhaust gas emissions using simple measures which do not adversely affect the service life of the internal combustion engine or of components of the internal combustion engine.

SUMMARY OF THE INVENTION

In a method for operating an internal combustion engine including inlet valves with variably adjustable opening curves, during part-load operation, the closing time of the inlet valves and the fuel injection time are controlled as a function of the cylinder internal temperature so as to maintain the cylinder internal temperature relatively low in a controllable manner for reducing $NO_x$ emissions.

This provides for a closed-loop temperature-controlled combustion in which the cylinder internal temperature constitutes the closed-loop control variable. This ensures that, in part-load operation, the optimum temperature prevails in the combustion chamber, as a result of which in particular the $NO_x$ emissions are reduced. In the case of a diesel engine, the internal temperature and the internal pressure required for auto-ignition can be set with a high degree of precision.

With the closing of the inlet valve delayed beyond the bottom dead center, the combustion chamber content remains flow-connected to the intake tract during the compression phase, as a result of which a pressure reduction and also an associated temperature reduction are obtained in the combustion chamber. The combustion chamber content is partially conducted back again into the intake tract via the open inlet valve.

Also in the event of an early closure of the inlet valve— with the closing time already before bottom dead center—a reduced internal pressure and a reduced internal temperature are generated, since the combustion chambers are filled only to a reduced degree.

In both cases, that is to say with a closure of the inlet valves before bottom dead center and also with of closure of the inlet valves after bottom dead center, the cylinder internal temperature can be effectively adjusted. The closing times of the inlet valve are changed in particular in a middle part-load range of the internal combustion engine in which maximum combustion chamber filling is not required. On account of the slightly reduced air component, it is possible to slightly enrich the air/fuel mixture, which further reduces the $NO_x$ emissions.

A further advantage of the method according to the invention is the comparatively homogeneous distribution of the air/fuel mixture in the combustion chamber during part-load operation, since additional flow turbulence is generated in the combustion chamber as a result of the displacement of the closing time of the inlet valve, which additional flow turbulence ensures better mixing in the combustion chamber. In the case where the closure is delayed beyond bottom dead center, there is also more time available for the mixing.

The angle range within which the closing time of the inlet valves can be varied is expediently approximately between 60° before bottom dead center and 120° after bottom dead center. This results, in contrast to conventional, fixed closing curves, in a total angle range of approximately 180° within which the closing curve can be varied in order to obtain a homogeneous mixture and for $NO_x$ reduction.

In order to assist homogenization, it can be expedient for a uniform fuel distribution in the combustion chamber, if the fuel is distributed in the combustion chamber by means of a plurality of fuel injection nozzles or nozzle openings per cylinder.

In a preferred refinement, at least two inlet valves are provided in each cylinder, wherein both synchronous and also asynchronous actuation of the two inlet valves with displaced closing times is possible in part-load operation. For example, it is possible for the inlet valves at each cylinder to be held open beyond bottom dead center but to have different closing times.

A further aspect of the invention resides in the realization of so-called internal exhaust gas recirculation, in which the exhaust gas is recirculated from the exhaust system back into the intake tract via the cylinder. This is achieved for example by simultaneously holding open the outlet valves and the inlet valves at the cylinders during an overlap phase.

In the internal combustion engine according to the invention, in part-load operation, the inlet valves are variably adjusted by actuating signals of a closed-loop and open-loop control unit, with the closing times of the inlet valves and the fuel injection time being determined as a function of the cylinder internal temperature. In full-load operation and expediently also in lower part-load operation, in contrast, a switch is preferably made to a fixedly predefined closing curve of the inlet valves, according to which the inlet valve are closed at bottom dead center. If appropriate, however, a variable adjustment of the inlet valve lift curve is also possible in full-load operation and in lower part-load operation ranges.

The internal combustion engine can be equipped with various additional units, for example with an exhaust gas turbocharger, if appropriate also with two series-connected exhaust gas turbochargers, one exhaust gas turbine or both exhaust gas turbines of which can be equipped with a variable turbine geometry for the variable adjustment of the effective turbine inlet cross section. Also possible is a by-pass past one or past both turbines and/or past one or past both compressors of the turbocharger. This provides additional adjustment possibilities for influencing the exhaust gas back pressure and the charge pressure.

An exhaust gas recirculation device can also be provided which comprises a recirculation line between the exhaust system and the intake tract. For the closed-loop control of the exhaust gas mass flow which is to be recirculated, an adjustable check valve is arranged in the recirculation line; a cooler can additionally be provided for exhaust gas cooling. This so-called external exhaust gas recirculation, which is realized by means of an additional recirculation line, can be combined with the above-described internal exhaust gas recirculation, wherein according to one expedient embodiment, the internal exhaust gas recirculation is activated initially, and the external exhaust gas recirculation is activated only at the moment when the exhaust gas mass flow which is to be recirculated can no longer be provided by means of the internal exhaust gas recirculation alone.

It is additionally possible that a common exhaust gas collecting rail is provided, into which the exhaust gas of all the cylinders is discharged. The exhaust gas collecting rail can be cooled separately. Also possible is an infeed of additional air by means of a compressor, as a result of which the exhaust gas back pressure is increased. The increased pressure in the exhaust gas collecting rail can be utilized in turn for exhaust gas recirculation in a wide operating range. Also possible is an increase in engine braking power as a result of the increased exhaust gas back pressure.

A further possibility for increasing the pressure in the exhaust gas collecting rail involves a partial cylinder shutoff and the utilization of the non-fired cylinders as compressors which compress the supplied combustion air and discharge said combustion air into the exhaust gas collecting rail. By means of suitable open-loop control of the inlet and outlet valves of the non-fired cylinders, a charge pressure increase in the intake tract is also possible by virtue of the combustion air which is compressed in the nonfired cylinders being discharged into the intake tract and being supplied to the fired cylinders.

Further advantages and expedient embodiments of the inventions will become apparent from the following description of the invention with reference to the accompanying drawings:

DESCRIPTION OF PARTICULAR EMBODIMENTS

In the figures, identical components are provided with the same reference symbols.

Figure 1:
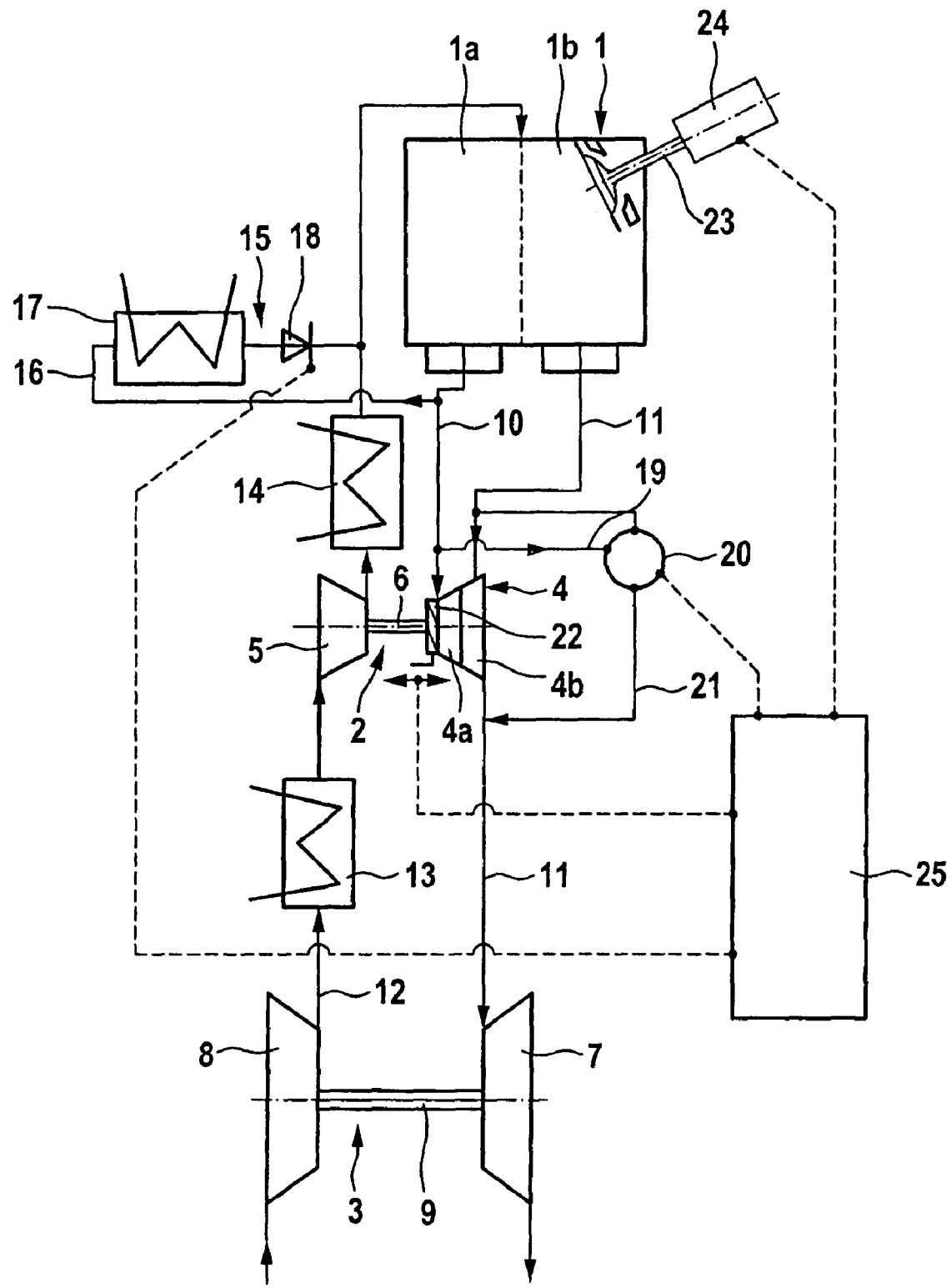
FIG. 1 is a schematic illustration of an internal combustion engine with two-stage charging and an exhaust gas recirculation device.

The internal combustion engine 1—a spark-ignition engine or a diesel engine—illustrated in FIG. 1 is equipped with two series connected exhaust gas turbochargers 2 and 3, of which the exhaust gas turbocharger 2 which is arranged close to the engine assumes the function of a high-pressure turbocharger and the exhaust gas turbocharger 3, which is arranged remote from the engine, assumes the function of a low-pressure turbocharger. The high-pressure turbocharger is of smaller size than the low-pressure turbo-charger and therefore has a lower mass moment of inertia.

The exhaust gas turbocharger 2 close to the engine comprises an exhaust gas turbine 4 in the exhaust system of the internal combustion engine, the turbine wheel of which exhaust gas turbine is connected by means of a shaft 6 to the compressor wheel in the compressor 5 in the intake tract 12. The exhaust gas turbine 4 is of double-flow design and comprises two exhaust gas flows passages 4a and 4b of different sizes. The two exhaust gas flow passages 4a and 4b are connected, by means of in each case one exhaust gas line section 10 and 11, to in each case one cylinder bank 1a and 1b of the internal combustion engine 1. Only the exhaust gas of the relevant cylinder bank 1a or 1b is conducted via the assigned exhaust gas line section 10 and 11 into the respective exhaust gas flow passage 4a and 4b.

In addition, the exhaust gas turbine 4 is equipped with a variable turbine geometry 22, by means of which the effective turbine inlet flow cross section is adjusted between a minimal blocking position and a maximum open position. The variable turbine geometry 22 is designed for example as an axially displaceable guide vane structure or as an axially fixed guide vane structure with adjustable guide vanes.

A bypass which bypasses the exhaust gas turbine 4 branches off from the exhaust line 11. Said bypass comprises a bridging line 21 which branches off from the exhaust line 11 upstream of the exhaust gas turbine and opens out into the exhaust line 11 again downstream of the exhaust gas turbine. Situated in the bridging line 21 is an adjustable check valve 20. In addition, a line section 19 which branches off from the first exhaust line 10, which is assigned to the smaller exhaust gas flow 4a, is provided, which line section 19 opens out into the bridging line 21. It is possible by means of the check valve 20 for both the throughflow through the bridging line 21 and also the throughflow through the line section 19 to be controlled in a closed-loop fashion. In this way, it is possible, in a blocking position, for the bridging line 21 to be completely closed, so that the line section 19 is also blocked off and the exhaust gas is not guided through the bypass either from the exhaust line 10 or from the exhaust line 11. In a first open position, the line section 19 is closed and the bridging line 21 is open, so that only the exhaust gas from the line section 11 for the larger exhaust gas flow 4b is conducted via the bypass, but not the exhaust gas from the line section 10 for the smaller exhaust gas flow 4a. In a second open position, the conditions are reversed, so that only the exhaust gas from the line section 10 but not the exhaust gas from the line section 11 is conducted via the bypass. In a third open position, exhaust gas flow passes between the line sections 10 and 11, but no exhaust gas is conducted via the bridging line to bypass the exhaust gas turbine. It is finally also possible for the exhaust gas to be discharged from both line sections 10 and 11 via the bypass.

The exhaust gas turbocharger 3 remote from the engine comprises an exhaust gas turbine 7 in the exhaust system, the turbine wheel of which exhaust gas turbine 7 is connected by means of a shaft 9 to the compressor wheel in the compressor 8, with the compressor 8 being arranged in the intake tract 12 of the internal combustion engine. In operation of the internal combustion engine, the compressor 8 sucks combustion air in and increases the combustion air pressure to an increased pressure, at which the combustion air is initially cooled in a first charge air cooler 13. In the further course, the pre-compressed combustion air is supplied to the compressor 5, which is connected downstream, of the exhaust gas turbocharger close to the engine. Down-stream of the compressor 5, the compressed combustion air is cooled in a second charge air cooler 14 and is subsequently supplied under charge pressure to the cylinders of the internal combustion engine.

On the exhaust gas side, the exhaust gas which is generated in the internal combustion engine in the cylinder banks 1a and 1b is supplied via the exhaust lines 10 and 11 to the exhaust gas flow passages 4a and 4b of the exhaust gas turbine 4, whereby the turbine wheel is driven. After expansion in the exhaust gas turbine 4, the exhaust gases are collected in the exhaust line section 11 and supplied to the exhaust gas turbine 7 of the turbocharger 3 remote from the exhaust gas turbine 7 where the residual energy of the exhaust gas is utilized for driving the turbine wheel.

In addition, an exhaust gas recirculation device 15 is provided which comprises an exhaust gas recirculation line 16 which branches off from the exhaust line 10 upstream of the exhaust gas turbine 4 and opens out into the intake tract 12 downstream of the second charge air cooler 14. Arranged in the exhaust gas recirculation device 16 are an exhaust gas cooler 17 and an adjustable check valve 18.

At least the cylinders of the second cylinder bank 1b of the internal combustion engine 1 are equipped with variably adjustable gas exchange valves 23 which can be adjusted by means of actuators 24 between a closed position and an open position. Said adjustable gas exchange valves 23 are in particular the inlet valves at the cylinders of the second cylinder bank 1b. However, the outlet valves may also be variably adjustable valves. Furthermore, also the gas exchange valves of the first cylinder bank 1a may be variably adjustable.

All the adjustable modular units of the internal combustion engine are controlled by a closed-loop and open-loop control unit 25. In the closed-loop and open-loop control unit 25, actuating signals are generated as a function of state and operating variables of the internal combustion engine and the units, by means of which actuating signals in particular the check valve 18 in the exhaust gas recirculation line 16, the variable turbine geometry 22 in the exhaust gas turbine 4 close to the engine, and the actuator 24 for the gas exchange valve 23 and the check valve 20 in the bypass line 21 are acted on.

Figure 2:
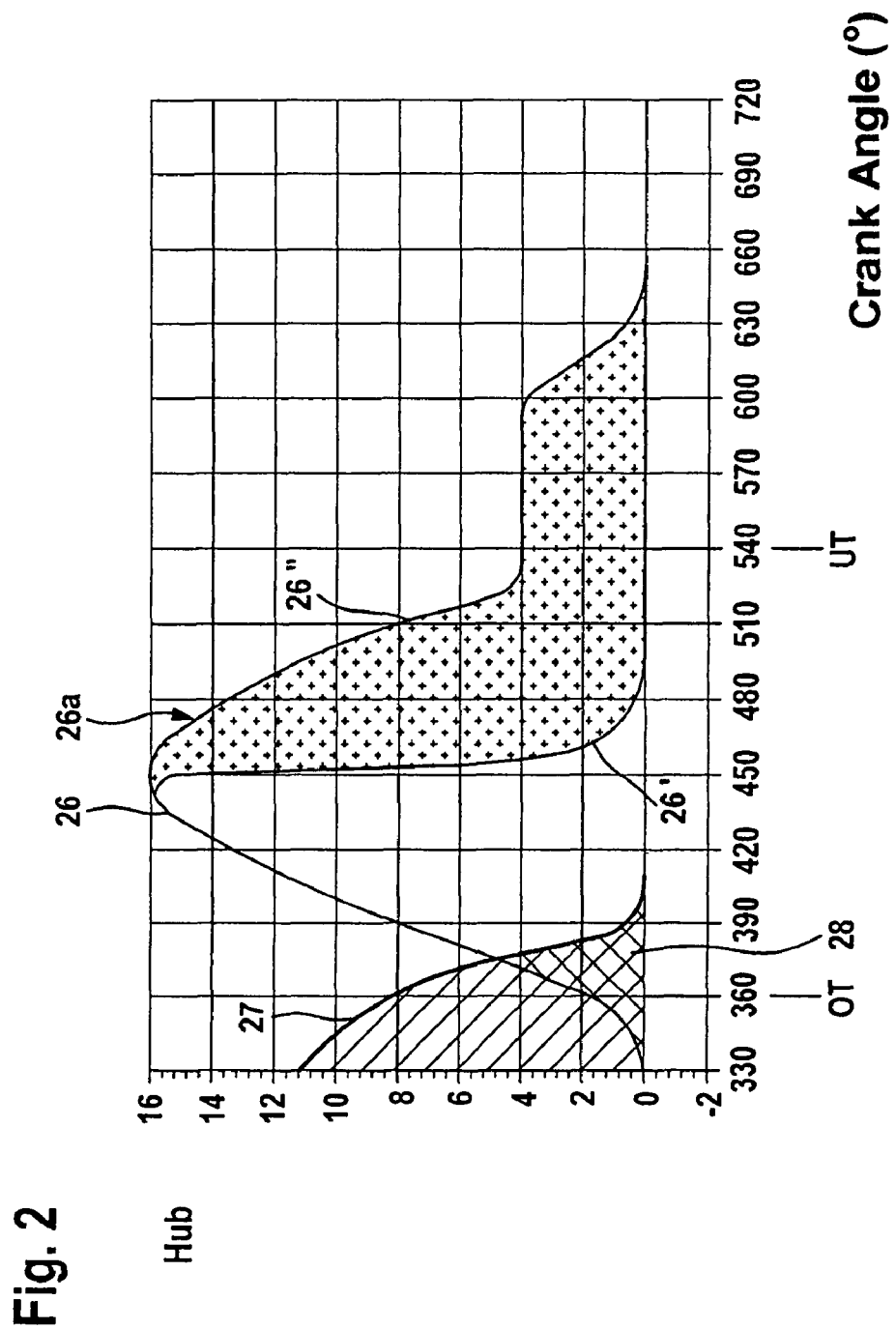
FIG. 2 shows a diagram with the profile of the opening curves of the outlet valve and inlet valve at the cylinder as a function of the crank angle.

The diagram in FIG. 2 illustrates the opening curves for the inlet valve and the outlet valve at a cylinder of the internal combustion engine. The lift of each inlet and outlet valve is shown as a function of the crank angle in degrees. Illustrated is a detail within a working cycle of the internal combustion engine in the range between 330° and 720° crank angle. The opening curve 26 of the inlet valve has a variable region 26a which is darkened in the diagram. The opening curve of the inlet valve can be varied within said darkened region. This means that a variation of the opening curve 26 during the closing movement of the inlet valve is possible in the area between the lines 26' and 26" which delimit the dark region. The marked region falls in the region of bottom dead center BDC subsequently to the combustion within one working cycle. In the case of the left-hand delimiting line 26', the closing time of the inlet valve is at approximately 60° before bottom dead center BDC; in the case of the right-hand delimiting line 26", the closing time of the inlet valve is at approximately 120° after bottom dead center BDC.

In the region of the preceding top dead center TDC, there is an overlap region in which the opening curves 26 of the inlet valve and 27 of the outlet valve overlap. In the overlap region 28, both the inlet valve and the outlet valve are open. The duration of the overlap region 28 can be adjusted either by varying the opening curve 26 of the inlet valve or by varying the opening curve 27 of the outlet valve or by varying both opening curves.

The dark region, delimited by the lines 26' and 26", within the opening curve 26 of the inlet valves makes it possible to influence the pressure $p_{cyl}$ and the temperature $T_{cyl}$ in the cylinder of the internal combustion engine. In particular in the case of the closure of the inlet valve along the outer delimiting line 26", the valve is closed in a delayed fashion, so that the inlet valve remains open for a short time when the piston is already in the compression phase. In this way, combustion air is recirculated from the combustion chamber into the intake tract via the still-open inlet valve, which results in a reduction of the cylinder internal pressure $p_{cyl}$ and of the cylinder internal temperature $T_{cyl}$.

The variation of the opening or lift curve 26 of the inlet valve can be utilized for homogeneous combustion during part-load operation of the internal combustion engine. By varying the opening curve within the delimiting lines 26' and 26", it is possible to set the cylinder internal pressure and in particular the cylinder internal temperature to predefined values. Together with a corresponding variation of the fuel injection time, conditions are created in the combustion chambers in part-load operation which promote homogeneous combustion with correspondingly reduced pollutants, in particular with reduced $NO_x$ emissions. Said variation of the inlet valve opening curve 26 can be extended into full-load operation.

Figure 3:
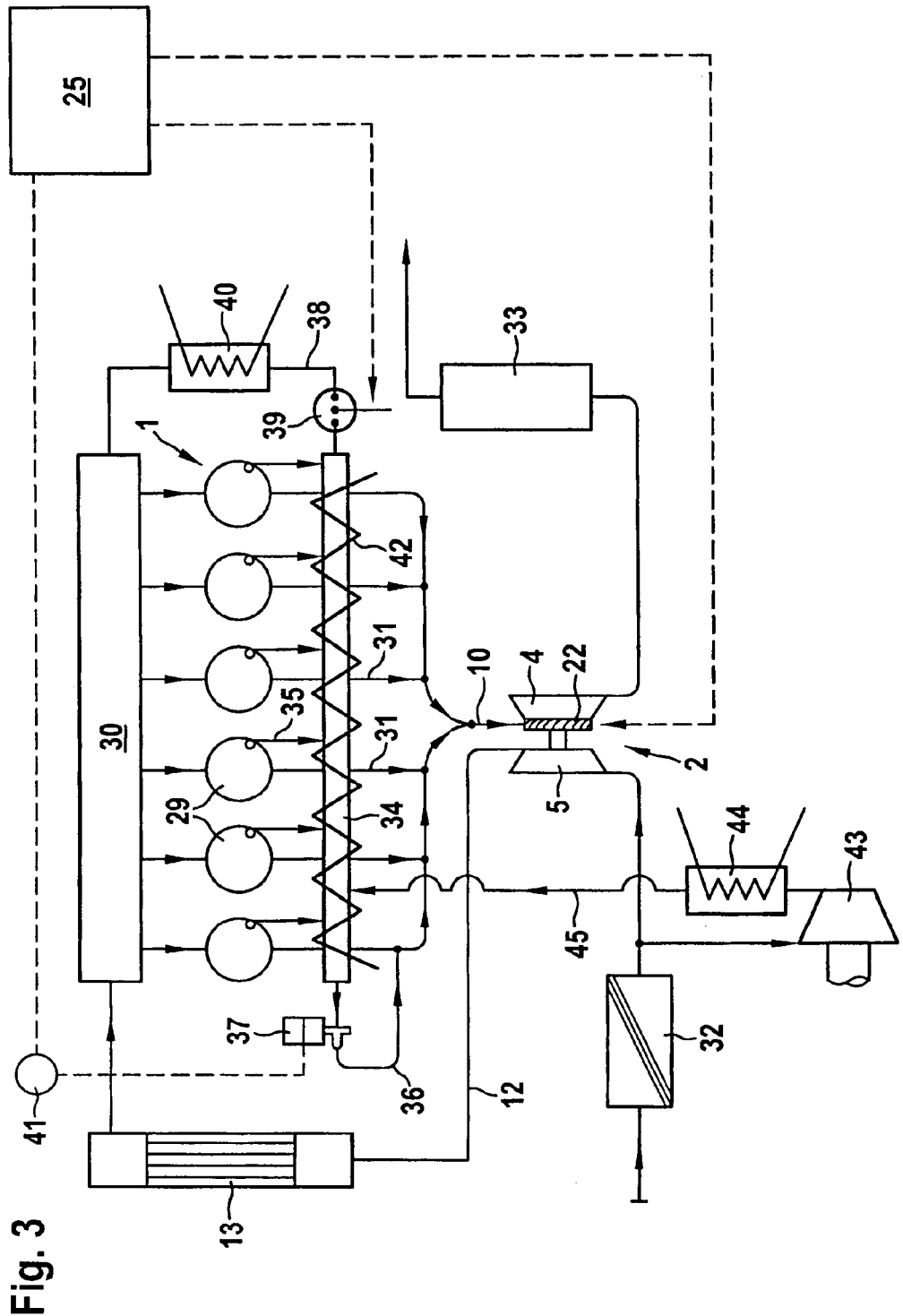
FIG. 3 is a schematic illustration of an embodiment of the internal combustion engine in which the cylinders of the internal combustion engine are connected to a common exhaust gas collecting rail.

The internal combustion engine 1 illustrated in FIG. 3 is likewise equipped with an exhaust gas turbocharger 2 whose exhaust gas turbine 4 is provided with a variable turbine geometry 22. At the air side, the combustion air which is taken in is initially purified in an air filter 32 and is subsequently compressed in the compressor 5 of the exhaust gas turbocharger 2. Downstream of the compressor 5, the compressed combustion air is cooled in a charge air cooler 13 and is subsequently supplied to a common air collector 30 from which the charge air flows into the combustion chambers of the cylinders 29.

At the exhaust gas side, the exhaust gases which are produced in the internal combustion engine are conducted via the exhaust line 10 of the exhaust system initially into the exhaust gas turbine 4, are expanded there and, in the further course downstream of the exhaust gas turbine, are supplied to an exhaust gas aftertreatment device 33 in which purification of the exhaust gases is carried out. The exhaust gas aftertreatment device 33 comprises in particular a catalytic converter and if appropriate an exhaust gas filter.

Additionally provided on the exhaust gas side is an exhaust gas collecting line 34 (rail) for all the cylinders 29 of the internal combustion engine. Each cylinder 29 is connected to the exhaust gas collecting rail 34 by means of in each case one brake valve 35. In the open position of the brake valves 35, the cylinder content of the respective cylinder 29 communicates with the exhaust gas collecting rail; in the closed position, a gas exchange between the cylinders and the exhaust gas collecting rail 34 is prevented. The brake valves 35 at each cylinder are provided in particular in addition to inlet and outlet valves at the relevant cylinder.

The exhaust gas collecting rail 34 is connected by means of an outflow line 36, in which an adjustable outflow valve 37 is provided, to the exhaust line 10 of the exhaust system of the internal combustion engine. When the outflow valve 37 is open, the gas content of the exhaust gas collecting rail 34 is flow-connected to the exhaust line 10.

The exhaust gas collecting rail 34 is additionally connected by means of an external exhaust gas recirculation device, which comprises a recirculation line 38, to the air collector 30. Situated in the recirculation line 38 are an adjustable check valve 39 and a cooler 40. In the open position of the check valve 39, the content of the exhaust gas collecting rail 34 is flow-connected to the air collector 30; when the valve is closed, in contrast, the flow connection is interrupted.

The check valve 39 and expediently also the outflow valve 37 are each designed so as to be stable with respect to pressure pulses. This can be obtained for example by a rotary slide valve.

The internal combustion engine 1 is additionally assigned a closed-loop and open-loop control unit 25 which, as a function of state and operating variables of the internal combustion engine 1 or of units assigned to the internal combustion engine, generates actuating signals for adjusting and controlling all the actuating units in the internal combustion engine, in particular the variable turbine geometry 22, the outflow valve 37 in the outflow line 36, and the controllable check valve 39 in the recirculation line 38.

The closed-loop and open-loop control unit 25 measures inter alia also the state of a brake switch 41 which can be actuated by the driver in order to manually adjust the out-flow valve 37 and therefore in order to adjust the pressure in a compressed air tank. Also particularly possible by means of the closed-loop and open-loop control unit 25, however, is an automatic adjustment of the outflow valve 37 without driver intervention.

The exhaust gas collecting rail 34 which communicates with the cylinders 29 permits various operating modes of the internal combustion engine. It is possible in particular by means of an adjustment of the valves 35, 37 and 39 which are assigned to the exhaust gas collecting rail 34 to influence the engine braking mode, exhaust gas recirculation and exhaust gas enrichment operating modes.

In order to improve the efficiency, the exhaust gas rail 34 includes a cooler 42 by means of which the gas content in the exhaust gas collecting rail 34 is cooled. It is also possible by means of a compressor 43 for additional air to be fed into the exhaust gas collecting rail 34 by way of a line 45. The compressor 43 takes air from the intake tract 12, and a further cooler 44 for cooling the compressed air is arranged in the line 45 extending between the compressor 43 and the exhaust gas collecting rail 34. It is possible by means of the compressor 43 for the pressure in the exhaust gas collecting line 34 to be increased.

The pressure in the exhaust gas collecting rail 34 can however also be increased independently of the compressor 34 in that individual cylinders 29 of the internal combustion engine 1 are shut off and serve as compressors for the combustion air which is taken in, which combustion air is conducted from the air collector 30 into the combustion chambers of the shut-off cylinders 29, is compressed there and is subsequently discharged via the open brake valves 35 into the exhaust gas collecting rail 34.

What is claimed is:

1. A method for operating an internal combustion engine having cylinders (29) with inlet and outlet valves (23) arranged at the cylinders (29) of the internal combustion engine (1), said intake valves (23) having an opening curve (26) which is variably adjustable as a function of state and operating variables of the internal combustion engine (1), said method comprising the steps of:
controlling during part-load operation of the internal combustion engine (1), the closing time of the inlet valves and the fuel injection time as a function of the cylinder internal temperature ($T_{cyl}$).

2. The method as claimed in claim 1, wherein the inlet valves are held open beyond bottom dead center (BDC) during part-load operation of the internal combustion engine (1).

3. The method as claimed in claim 2, wherein the inlet valves are held open maximally until of 120° after bottom dead center (BDC).

4. The method as claimed in claim 1, wherein the inlet valves are closed already before bottom dead center (BDC) in part-load operation of the internal combustion engine (1).

5. The method as claimed in claim 4, wherein the inlet valves are closed not earlier than 60° before bottom dead center (BDC).

6. The method as claimed in claim 1, wherein, with at least two inlet valves per cylinder (29), the inlet valves of one cylinder (29) are operated synchronously.

7. The method as claimed in claim 1, wherein, with at least two inlet valves per cylinder (29), the inlet valves of one cylinder (29) are operated asynchronously.

8. The method as claimed in claim 7, wherein all the inlet valves of said cylinder (29) are held open beyond bottom dead center but are closed at different times.

9. The method as claimed in claim 1, wherein, during full-load operation, the inlet valves are closed at bottom dead center (BDC).

10. The method as claimed in claim 1, wherein during lower part-load operation, the inlet valves are closed at bottom dead center (BDC).

11. The method as claimed in claim 1, wherein, in order to realize internal exhaust gas recirculation through the cylinders (29) of the internal combustion engine (1), the inlet valves and the outlet valves are controlled so as to be simultaneously opened during an overlap phase.

12. An internal combustion engine having cylinders (29) with inlet and outlet valves (23) arranged at the cylinders (29) of the internal combustion engine (1) and an intake tract (12) for supplying combustion air to the cylinders (29) and an exhaust tract (10, 11) for the discharge of exhaust gas from the cylinders (29), said intake valves (23) having an opening curve (26) which is variably adjustable as a function of state and operating variables of the internal combustion engine (1), said internal combustion engine including a closed-loop and open-loop control unit (25) for variably controlling, during part-load operation of the internal combustion engine (1), the opening of the inlet valves by actuating signals providing for a closing time of the inlet valves and controlling the time of fuel injection into the cylinders (29) as a function of the cylinder internal temperature ($T_{cyl}$).

13. The internal combustion engine as claimed in claim 12, including an exhaust gas turbocharger (2) having an exhaust gas turbine (4) in the exhaust tract (10, 11) and a compressor (5) in the intake tract (12).

14. The internal combustion engine as claimed in claim 12, including two series-connected exhaust gas turbochargers (2, 3) arranged in the intake tract (12) and the exhaust tract (10, 11).

15. The internal combustion engine as claimed in claim 12, wherein an exhaust gas recirculation device has a recirculation line (38) between the exhaust and the intake tract (12) is provided and an adjustable check valve (39) is arranged on the exhaust gas recirculation line (38).

16. The internal combustion engine as claimed in claim 12, including a common exhaust gas collecting rail (34) connected to all the cylinders (29) for receiving exhaust gas from the cylinders (29).

17. The internal combustion engine as claimed in claim 16, wherein the exhaust gas collecting rail (34) is provided with a cooler (42).

18. The internal combustion engine as claimed in claim 16, including a compressor (43) for feeding additional air into the exhaust gas collecting rail (34).

\* \* \* \* \*